(12) United States Patent
Cobb

(10) Patent No.: US 11,451,520 B2
(45) Date of Patent: Sep. 20, 2022

(54) PRIVATE NETWORK AND APPLICATION PROVISIONING SYSTEM

(71) Applicant: Jonathan Cobb, Charlotte, NC (US)

(72) Inventor: Jonathan Cobb, Charlotte, NC (US)

(*) Notice: Subject to any disclaimer, the term of this patent is extended or adjusted under 35 U.S.C. 154(b) by 24 days.

(21) Appl. No.: 17/107,359

(22) Filed: Nov. 30, 2020

(65) Prior Publication Data
US 2021/0176219 A1 Jun. 10, 2021

Related U.S. Application Data

(60) Provisional application No. 62/943,884, filed on Dec. 5, 2019.

(51) Int. Cl.
H04L 29/06 (2006.01)
H04L 9/40 (2022.01)
H04L 9/32 (2006.01)
H04L 9/30 (2006.01)

(52) U.S. Cl.
CPC ............ *H04L 63/0428* (2013.01); *H04L 9/30* (2013.01); *H04L 9/321* (2013.01)

(58) Field of Classification Search
CPC ........ H04L 63/0428; H04L 9/30; H04L 9/321
See application file for complete search history.

(56) References Cited

U.S. PATENT DOCUMENTS

| | | | |
|---|---|---|---|
| 2004/0268142 A1* | 12/2004 | Karjala | H04L 63/0272 726/15 |
| 2019/0053050 A1* | 2/2019 | Jin | H04L 9/3234 |
| 2020/0004982 A1* | 1/2020 | Mumford | H04L 9/0844 |
| 2020/0120166 A1* | 4/2020 | Cardona-Gonzalez | H04L 67/141 |
| 2021/0297398 A1* | 9/2021 | Gupta | H04L 67/1095 |
| 2022/0094706 A1* | 3/2022 | Higgins | H04L 43/0876 |
| 2022/0109988 A1* | 4/2022 | Kotay | H04W 12/04 |

* cited by examiner

*Primary Examiner* — Chau Le
(74) *Attorney, Agent, or Firm* — Edlavitch Law PLLC

(57) ABSTRACT

Described herein are improved systems and methods for provisioning of private computer networks and application software as well as providing private SaaS.

20 Claims, 6 Drawing Sheets

PRIVATE NETWORK AND APPLICATION PROVISIONING SYSTEM

CROSS-REFERENCE TO RELATED APPLICATIONS

The present application claims the benefit of priority from U.S. Provisional Patent Application No. 62/943,884, filed on Dec. 5, 2019 and entitled "Methods and Systems for Private Software as a Service (SaaS)", the entire disclosure of which application is hereby incorporated herein by reference.

TECHNICAL FIELD

The present disclosure relates to the provisioning of private computer networks and application software. Some embodiments described herein relate to the providing of private software as a service (Private SaaS).

BACKGROUND

Software as a service (SaaS) is a software delivery model in which software is provided over a computer network, such as the Internet. The end users are often subscribers of the software and it is frequently provided on-demand. The software of SaaS is often centrally hosted.

A great benefit of SaaS is a SaaS provider's ability to offer a price that is competitive with on-premises software and still apply economies of scale to application operation. In short, a provider may be able to offer frequently updated and improved software as well as more reliable software than corresponding on-premises software at a similar or lower cost to the customer.

However, with the aforementioned benefits there are tradeoffs. And, there are a number of technical problems associated with SaaS. For example, because data is stored on a SaaS provider's servers and not the end user's servers, data security is greater technical problem. Also, for example, software can require integration with or at least access to an end user's private data. Such data can be sensitive and associated with a great number of parties. Thus, SaaS can be very risky and sometimes conflict with data governance regulations. These examples are just some of the many technical problems with SaaS.

SUMMARY

Described herein are improved systems and methods for overcoming technical problems associated with the provisioning of computer networks and application software as well as technical problems associated with the providing of software as a service (SaaS).

The systems and methods described herein can use or provide SaaS applications in a manner such that the SaaS vendor does not have access to customer data, yet a customer can successfully use the SaaS application. Such systems and methods can use or provide a SaaS application offered by a SaaS provider, represented by a collection of software and associated physical infrastructure upon which to operate it. Such systems and methods can use or provide a system provisioner that provides new server machines for use by individual clients or customers of the SaaS provider. And, such systems and methods can use or provide client nodes (e.g., server machines) that deliver the SaaS application to clients. With such a technical solution, client data can be inaccessible to the SaaS provider, even inaccessible to malicious actors that have infiltrated the SaaS provider.

In summary, the systems and methods (or technologies) disclosed herein can provide specific technical solutions to at least overcome the technical problems mentioned in the background section and other parts of the application as well as other technical problems not described herein but recognized by those skilled in the art and related to the provisioning of computer networks and application software as well as the providing of SaaS applications.

With respect to some embodiments, disclosed herein are computerized methods for provisioning of private computer networks and application software as well as providing private SaaS, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for novel and improved provisioning of private computer networks and application software as well as providing private SaaS.

With respect to some embodiments, a system is provided that includes at least one computing device configured to provide useful and novel provisioning of private computer networks and application software as well as providing private SaaS. And, with respect to some embodiments, a method is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

BRIEF DESCRIPTION OF THE DRAWINGS

The present disclosure will be understood more fully from the detailed description given below and from the accompanying drawings of various embodiments of the disclosure. It is to be understood that the accompanying drawings presented are intended for the purpose of illustration and not intended to restrict the disclosure.

DETAILED DESCRIPTION

Figure 1:
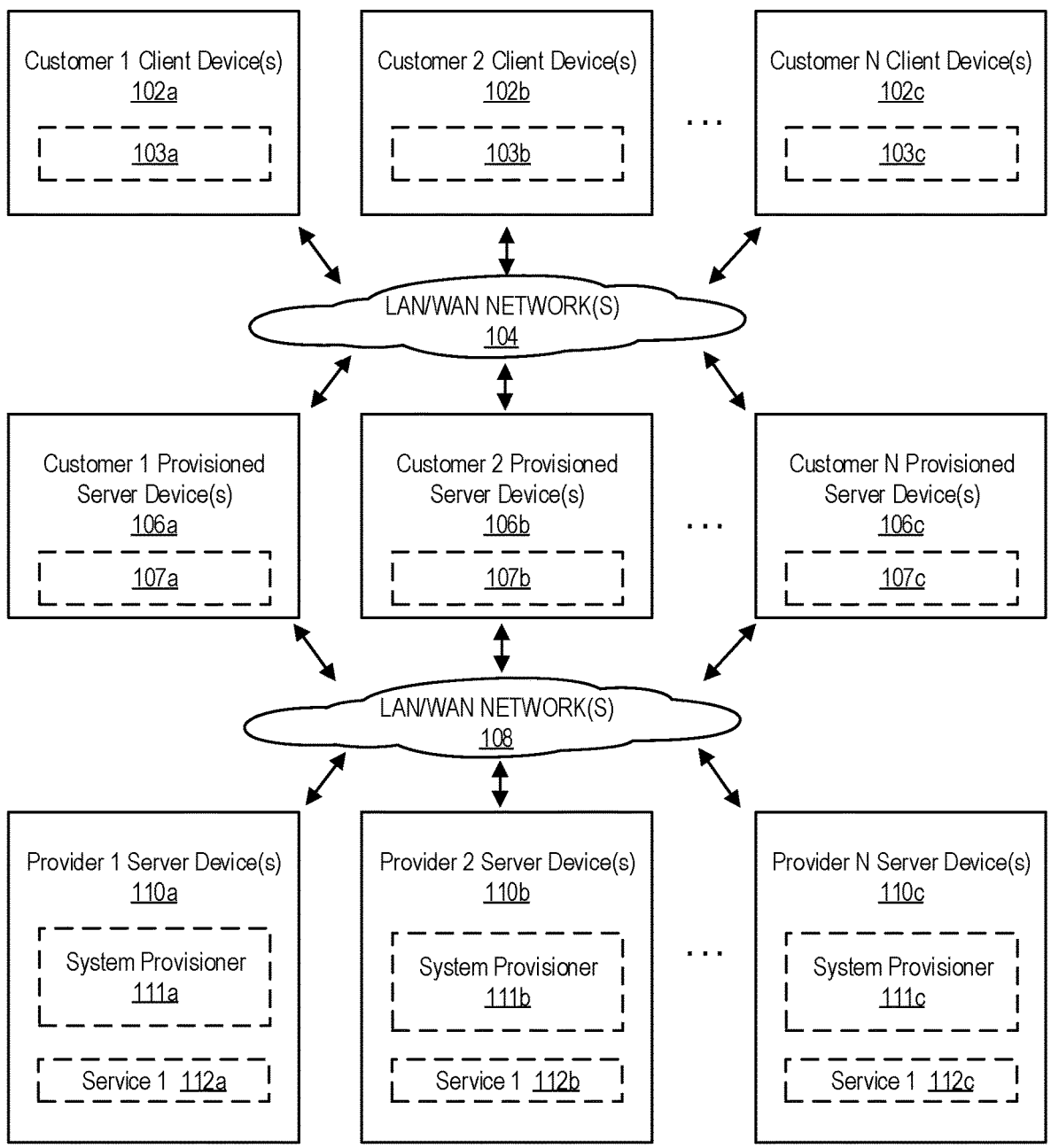
FIG. 1 illustrates an example network of computer systems to implement technologies for provisioning of private computer networks and application software as well as providing private SaaS, in accordance with some embodiments of the present disclosure.

Described herein are improved systems and methods for overcoming technical problems associated with provisioning of computer networks and application software as well as technical problems associated with providing SaaS applications.

Described herein are methods and systems for providing a SaaS application via a provisioned server that is exclusive to a client. The provisioned server can be provisioned by the provider of a SaaS application or another party that provisions such servers. The SaaS application vendor using or connecting to the provisioned server can provide technical aspects of the application via the provisioned server without having access to client or customer data involved in the application. This can occur because the application can be at least partially cloned on the provisioned server and an authentication method can be provided by the server that only allows for communication between the vendor and the server without the vendor having access to data stored in the server. Thus, the client or customer data involved in the application is used securely in the provisioned server. The preventing of the provider from accessing the provisioned server also provides an additional layer of security against malicious actors.

An example advantage of the technologies described herein is that a security breach at the SaaS provider does not result in the compromise of client data stored in a provisioned server. The SaaS can include providing a software application to end users over the Internet, such that the end users do not need to install any software other than a web browser. The entity providing the SaaS application (or the provider) can exercise a high degree of control over all technology that is used to provide the application. The provider can deploy and operate a multi-tenant infrastructure (MT-SaaS), in which customers or end users share a common set of technology resources. A multi-tenant deployment strategy has advantages in cost and efficiency, the provider can typically provide the application at lower cost, and the provider can scale the shared infrastructure to match the combined load of all their customers. A disadvantage of SaaS in general is that a failure or degradation of the MT-SaaS infrastructure will affect customers or end users. Another disadvantage, from the customer's point of view, is that the provider has access to whatever data the customer stores in the MT-SaaS application without use of the novel technologies described herein. A further disadvantage is that a data breach by a malicious actor can compromise data for the provider's customers.

The embodiments described herein can deploy an infrastructure specific to each specific customer. The embodiments described herein can deploy a ST-SaaS or single-tenant SaaS although such examples may not be exemplary embodiments. While this approach can reduce the cost efficiency of MT-SaaS, it has other advantages such as reduced blast radius of an infrastructure failure or degradation is limited to the individual customers whose underlying infrastructure has failed or degraded. Further, a security breach is also limited to the specific customers whose infrastructure has been compromised. However, this approach can have disadvantages (from the customer's point of view), such that the provider has access to end user and customer data. A security breach at the provider level may still compromise customer or end user accounts, and malicious actors that have infiltrated the provider may have unfettered access to customer data. This can be in spite of specific internal controls set by the provider to prevent such access.

In exemplary embodiments, the ST-SaaS model can be further implemented as a Private SaaS (P-SaaS). In such embodiments, P-SaaS can provide all of the advantages of ST-SaaS, with an additional guarantee that the provider is prohibited from accessing the customer's or end user's data stored in a provisioned server. Such a guarantee is backed by the design and architecture of the P-SaaS system in that provider access to customer or end user data is limited or completely eliminated.

Because customer-specific infrastructure would still make use of some shared provider resources, access to such resources is mediated by secure protocols in exemplary embodiments. There are three main processes of P-SaaS that will be discussed herein, including the starting of service for a new customer, customer application usage service, and the ending of service for a customer. Also, the systems for implementing such processes are described herein.

FIG. 1 illustrates an example network of computer systems 100 to implement technologies for provisioning of private computer networks and application software as well as providing private SaaS, in accordance with some embodiments of the present disclosure. The example network of computer systems 100 can implement any of the aforesaid components and operations as well as any component or operation described herein.

The network of computer systems 100 is shown including client devices of different customers or end users (e.g., see client device(s) 102a, 102b, and 102c). Each of the client devices can store, in data storage devices or in memory, instructions for a client-side aspect of an application of a private SaaS (e.g., see client-side aspects 103a, 103b, and 103c). The network of computer systems 100 is also shown including at least one local area network (LAN) and at least one wide area network (WAN) communicatively coupling the client devices with provisioned server devices for the different customers or end users (e.g., see LAN/WAN network(s) 104 and provisioned server device(s) 106a, 106b, and 106c). The network of computer systems 100 is also shown including at least one local area network (LAN) and at least one wide area network (WAN) communicatively coupling the provisioned server devices with server devices of different SaaS providers (e.g., see LAN/WAN network(s) 108 and provider server device(s) 110a, 110b, and 110c). Each of the provider server devices can store, in data storage devices or in memory, instructions for a system provisioner and server-side aspects of an application of a private SaaS (e.g., see system provisioners 111a, 111b, and 111c and server-side aspects 112a, 112b, and 112c). Each of the provisioned server devices can store, in data storage devices or in memory, instructions for copied or derived server-side aspects of an application of a private SaaS (e.g., see copied or derived server-side aspects 107a, 107b, and 107c), which are copied or derived from corresponding instructions for server-side aspects stored in a provider server device.

Each of the LAN/WAN network(s) 104 and 108 can include the Internet and/or any other type of interconnected communications network. Each of the LAN/WAN network(s) 104 and 108 can also include a single computer network or a telecommunications network. More specifically, each of the LAN/WAN network(s) 104 and 108 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN. The LAN/WAN network(s) 104 and 108 can be a part of the same greater network or parts of greater separate networks. And, in some embodiments, the LAN/ WAN network(s) 104 and 108 can be the same or overlapping network(s).

At least each shown component of the network of computer systems 100 can be or include a computer system which can include memory that can include media. The media can include or be volatile memory components, non-volatile memory components, or a combination of such. In general, each of the computer systems can include a host system that uses the memory. For example, the host system can write data to the memory and read data from the memory. The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

In some embodiments, a novel system can include a provisioner device of an application provider (e.g., see provisioner 111*a*), configured to provision a private application server (e.g., see provisioned device(s) 106*a*) to exclusively interact with one or more client devices (such as one or more predetermined client devices), e.g., see client device(s) 103*a*, and remove the provisioning of the provisioned server. The system can also include an application server device of the application provider (e.g., see server device(s) 110*a*), configured to: host an application so that the application is available as a software as a service (SaaS), execute processes of the application, and control interactions with some of the processes of the application through the provisioned server. E.g., see server-side aspect 112*a*.

The system can also include the provisioned server (e.g., see provisioned device(s) 106*a*) which can be configured to configure itself to interact with the one or more client devices exclusively (e.g., see client device(s) 103*a*) after being provisioned by the provisioner device (e.g., see provisioner 111*a*). The self-configuration occurs according to a package sent from a device of the application provider. The provisioned server can be configured to send output of the application to the one or more client devices, and the output of the application is received from the application server device (e.g., see server device(s) 110*a*). Also, the provisioned server can be configured to accept a configuration package from the application server device and configure itself to interact with the one or more client devices exclusively using the configuration package. The configuration can include generation of a public key of the provisioned server and a corresponding private key. And, the provisioned server can be configured to encrypt messages based on the corresponding private key and an encryption algorithm and send the encrypted messages to the application server device and the one or more client devices.

The application server device (e.g., see server device(s) 110*a*) can be configured to store the public key and notify the one or more client devices (e.g., see client device(s) 103*a* that the provisioned server (e.g., see provisioned device(s) 106*a*) can be configured to interact with the one or more client devices exclusively. And, the provisioned server can be configured to interact with the one or more client devices exclusively after the notification is received by the one or more client devices. The provisioned server can be configured to receive a request from the one or more client devices to initiate interaction with the application. The interaction with the application can be via the provisioned server. The provisioned server can also be configured to receive output of the application from the application server device of the provider and send the output to the one or more client devices after verifying validity of the output according to the public key.

In some embodiments, the aforesaid system or a related system can implement novel methods for providing a SaaS application via a provisioned server that is exclusive to a client. Such methods can include a method that includes provisioning, by a provider computing system of an application provider, an application server to exclusively interact with one or more client devices (such as one or more predetermined client devices). E.g., see the steps of workflow 200 shown in FIG. 2. The provisioning can use a first authentication method that allows access to the application server by the provider computing system and secures communications between the provider computing system and the application server. E.g., see steps 214 to 222 shown in FIG. 2. The method can also include copying at least part of the application to the provisioned server using the self-configuration instructions. E.g. see step 218 shown in FIG. 2. The first authentication method can use a public key of the provider computing system. The method can also include securely sending, by the provider computing system, self-configuration instructions to the provisioned server using the first authentication method as well as generating, by the provisioned server, a second authentication method using the self-configuration instructions. E.g., see steps 218 to 224 shown in FIG. 2. The method can also include disabling, by the provisioned server, the first authentication method using the self-configuration instructions, so that the provider computing system no longer has access to the provisioned server. E.g., the disabling of the first authentication method can occur after step 222 shown in FIG. 2.

The second authentication method can provide secure communications between the provisioned server and the one or more client devices as well as between the provisioned server and the provider computing system. E.g., see steps 226 to 232 shown in FIG. 2. The second authentication method can use a public key of the provisioned server. Each one of the first and second authentication methods can include respective generation of a public key and a corresponding private key.

The method can also include storing, by the provider computing system, the public key of the provisioned server as well as notifying, by the provider computer system, the one or more client devices that the provisioned server is configured to interact with the one or more client devices exclusively. E.g. see step 228 shown in FIG. 2. The method can also include the provisioned server interacting with the one or more client devices exclusively after the notification is received by the one or more client devices. E.g. see steps 230 to 232 shown in FIG. 2.

The method can also include serving to the one or more client devices, via the provisioned server, an application hosted by the provider computing system. E.g. see the steps of workflow 300 shown in FIG. 3. The method can include receiving, by the provisioned server, a request sent from the one or more client devices to initiate interaction with the application. E.g. see steps 304 to 306 shown in FIG. 3. The interaction with the application by the client is via the provisioned server. E.g., see steps 304 to 306 and 318 to 320 shown in FIG. 3. The method can also include verifying and accepting, by the provisioned server, the request according to the second authentication method as well as delegating, by the provisioned server, a task of the application to the provider computing system using the second authentication method. E.g., see steps 308 to 316 shown in FIG. 3. The method can also include receiving, by the provisioned server, output of the delegated task using the second authentication method, verifying, by the provisioned server, validity of the output of the delegated task according to the public key of the provisioned server, and sending, by the provisioned server, the output to the one or more client devices after verifying validity of the output. E.g., see steps 316 to 320 shown in FIG. 3.

The method can also include removing, by the computing system, the provisioning of the provisioned server after a request to cancel the application is received from the provisioned server. The method can also include removing, by the computing system, the provisioning of the provisioned server after a request to cancel the application is received from one of the one or more client devices. E.g. see the steps of workflows 400 and 500 shown in FIGS. 4 and 5, respectively.

In some embodiments, the method can be implemented by a non-transitory computer readable medium tangibly encoded with computer-executable instructions, that when executed by a processor associated with a computing device, performs the method.

Figure 2:
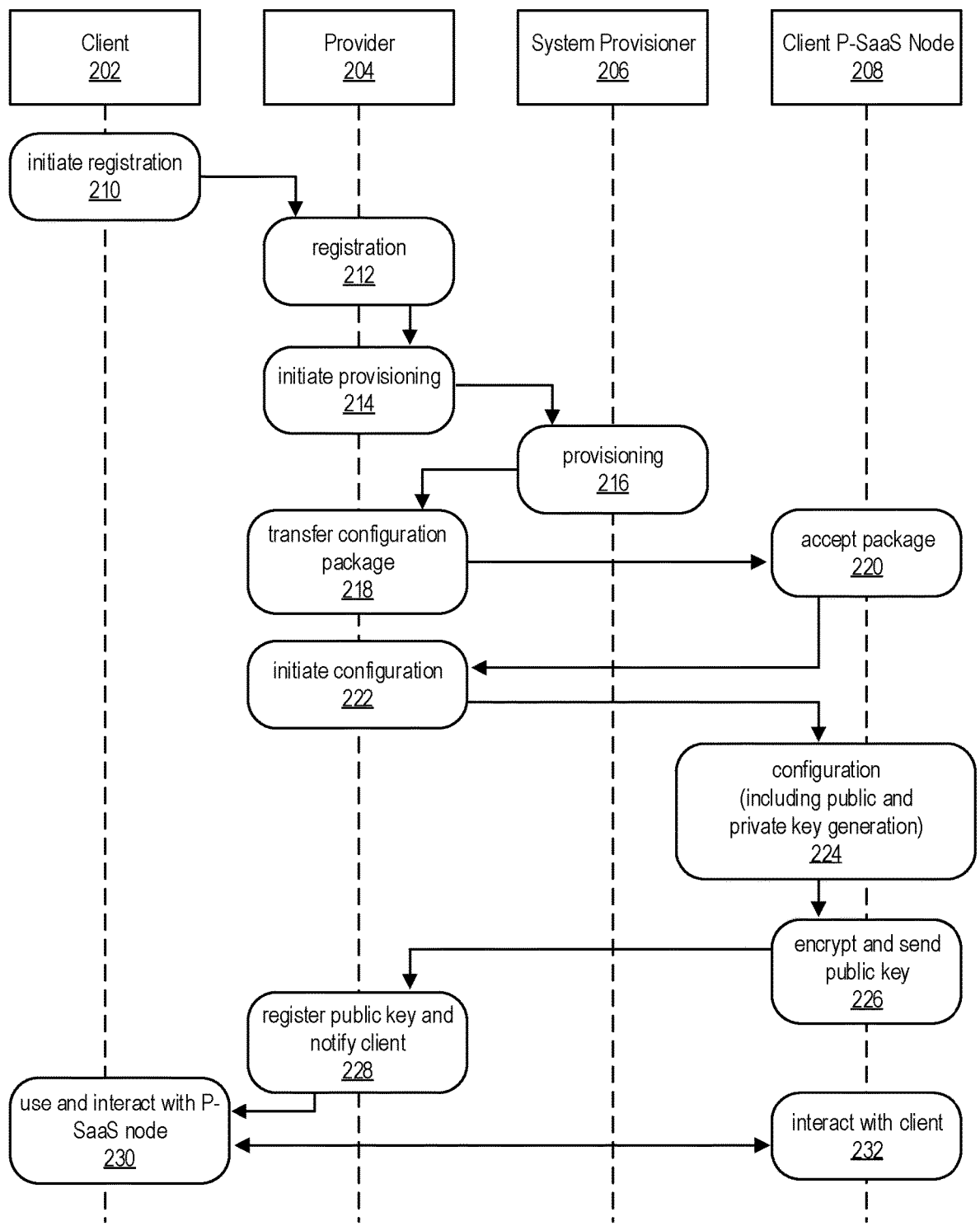
FIG. 2 illustrates an example workflow for starting service using the technologies for provisioning of private computer networks and application software as well as providing private SaaS, in accordance with some embodiments of the present disclosure.

As mentioned herein, FIG. 2 illustrates an example workflow 200 for starting service using the technologies for provisioning of private computer networks and application software as well as providing private SaaS, in accordance with some embodiments of the present disclosure. FIG. 2 shows a workflow for starting service for a new customer of private SaaS according to some embodiments of the present disclosure.

The steps of workflow 200 are implemented by technical aspects of client 202 (e.g., see client device(s) 102a), provider 204 (e.g., see provider server device(s) 110a), system provisioner 206 (e.g., see system provisioner 111a), and client P-SaaS node 208 (e.g., see provisioned server device(s) 106a). The provider 204 can be or include a company or entity that offers an online application or service for a client. The system provisioner (or the provisioner) 206 can be or include a company or entity that provides computing machines (such as raw computing machines without a high-level operating system or any operating system installed) ready for configuration. When provisioning is complete, the client 202 has access and the provider 204 has partial access to the new system (i.e., the client P-SaaS node 208 before it is specifically configured), which can have nothing installed on it except for a basic operating system image initially. For example, a department within a company physically places a new server into a datacenter rack and configures basic networking and connectivity or wipes an existing physical server to prepare it for use. The client P-SaaS node 208 (or the client node or just referred to as "the node" herein) can be or include the server machine through which the customer will have access to the application or service of the provider 204.

The workflow 200, at step 210, commences with client 202 initiating registration with a service or application provided by the provider 204. The initiation at step 210 can occur via a client-side aspect of the service or application (e.g., see client-side aspects 103a, 103b, and 103c). The workflow 200, at step 212, continues with the provider 204 registering the client 202 for the service or application. The registration at step 212 can occur via a server-side aspect of the service or application (e.g., see server-side aspects 112a, 112b, and 112c). A client (or customer) signs up for an application or service provided by provider. An API call can be used for the provider to initiate service for a new customer.

The workflow 200, at step 214, continues with the provider 204 initiating provisioning, via a system provisioner 206 (e.g., see provisioners 111a, 111b, and 111c), of a client P-SaaS node 208 (e.g., see provisioned server device(s) 106a, 106b, 106c). The initiating of the provisioning at step 214 can occur via a server-side aspect of the service or application (e.g., see server-side aspects 112a, 112b, and 112c) or via the system provisioner (not shown in the drawings). The workflow 200, at step 216, continues with the system provisioner 206 provisioning available one or more servers as the client P-SaaS Node 208. The provider 204 provisions a new node (e.g., node 208) for the client 202. The provisioned system (e.g., node 208) can have a basic operating system image and can have at least one public IP address so that the provider can connect to it. The provisioned system (e.g., node 208) will also have an authentication method installed that allows the provider to connect to it. One method can be or include for the provisioner 206 to place the public key of the provider 204 in a special place that allows the provider (using the corresponding private key) to connect to the provisioned system.

The workflow 200, at step 218, continues with the provider 204 transferring a configuration package to the client P-SaaS node 208. The transferring at step 217 can occur via the server-side aspect of the service or application. The workflow 200, at step 220, continues with the client P-SaaS node 208 receiving and accepting the configuration package. The receiving and accepting of the package can occur via a second server-side aspect of the service or application or a copied or derived version of the server-side aspect (e.g., see copied or derived server-side aspects 107a, 107b, and 107c). The workflow 200, at step 222, continues with the provider 204 initiating configuration of the client P-SaaS Node 208. The initiating of the configuration at step 222 can occur via the server-side aspect of the service or application. Subsequent to step 222, when starting service for a new customer, new infrastructure is provisioned and configured to become the client node (e.g., node 208) that will deliver the provider's application to the end user. During this process, the provider 204 loses direct access to the client node and can no longer perform any direct operations on it, for example the provider 204 can no longer log in and issue administrative operating system commands. The workflow 200, at step 224, continues with the client P-SaaS node 208 configuring itself, which includes the generation of public and private keys for itself.

The provider 204 can copy a self-setup package to the provisioned system (e.g., node 208). This package can include the software and data required to transform the raw or blank provisioned system (e.g., node 208) into a functioning client node capable of serving the provider's application or service to the end user. The provider 204 uses the pre-configured authentication method set up by the provisioner 206 to make the copy. The provider 204 initiates the setup process on the provisioned system (e.g., node 208), again using the same preconfigured authentication method set up by the provisioner 206. The self-setup package runs on the provisioned system (e.g., node 208), transforming it into a client node capable of providing the provider's application or service to the end user. At the beginning of the process, the self-setup package removes or otherwise disables the pre-configured authentication method that was installed by the provisioner 206. After this is done, there is no way for the provider 204 to gain direct access to the client node (e.g., node 208). The provider 204 can detect if the client node (e.g., node 208) is running and may communicate with it over the network, but the provider can no longer log in to the client node, and no longer has administrative privileges on the client node. The self-setup package includes the provider's public key. The self-setup package also directs the client node (e.g., node 208) to generate its own public and private keypair.

The workflow 200, at step 226, continues with the client P-SaaS node 208 encrypting and then sending the public key. The operations at steps 224 and 226 can occur via a second server-side aspect of the service or application or a copied or derived version of the server-side aspect. The workflow 200, at step 228, continues with the provider 204 registering the public key and notifying the client 202 of the registration of the public key of the client P-SaaS Node 208 and the completing of the registration process. The operations at step 228 can occur via the server-side aspect of the service or application.

Once setup is complete, the client node (e.g., node 208) sends a secure message to the provider 204 that started it, which results in registering with that provider. This message is encrypted using the provider's public key (thus, ensuring that only the provider can decrypt it and read it) and includes the provisioned node's public key. The first message allows the provider 204 to register the provisioned node's public key. From this point forward, messages sent from the provisioned node (e.g., node 208) to the provider 204 will be verifiable—if the message was not signed with provisioned node's key, the provider determines it is not a valid message. Reciprocally, a message sent from the provider 204 to the provisioned node (e.g., node 208) will be encrypted with the node's public key and signed with the provider's private key. This will allow the node (e.g., node 208) to verify the authenticity of the message and reject any message with an invalid signature. After the node (e.g., node 208) has successfully registered with the provider 204, it sends a message to the client 202 (for example an email message) with a link to the node. The client 202 follows the link and begins using the provider's application or service.

The workflow 200, at steps 230 and 232, continues with the client 202 using the client P-SaaS Node 208 and the second server-side aspect of the service or application or the copied or derived version of the server-side aspect as well as the client 202 and the client P-SaaS Node 208 interacting with each other. The operations at step 230 can be implemented by the client-side aspect of the service or application. The operations at step 232 can be implement by the second server-side aspect of the service or application or the copied or derived version of the server-side aspect.

Figure 3:
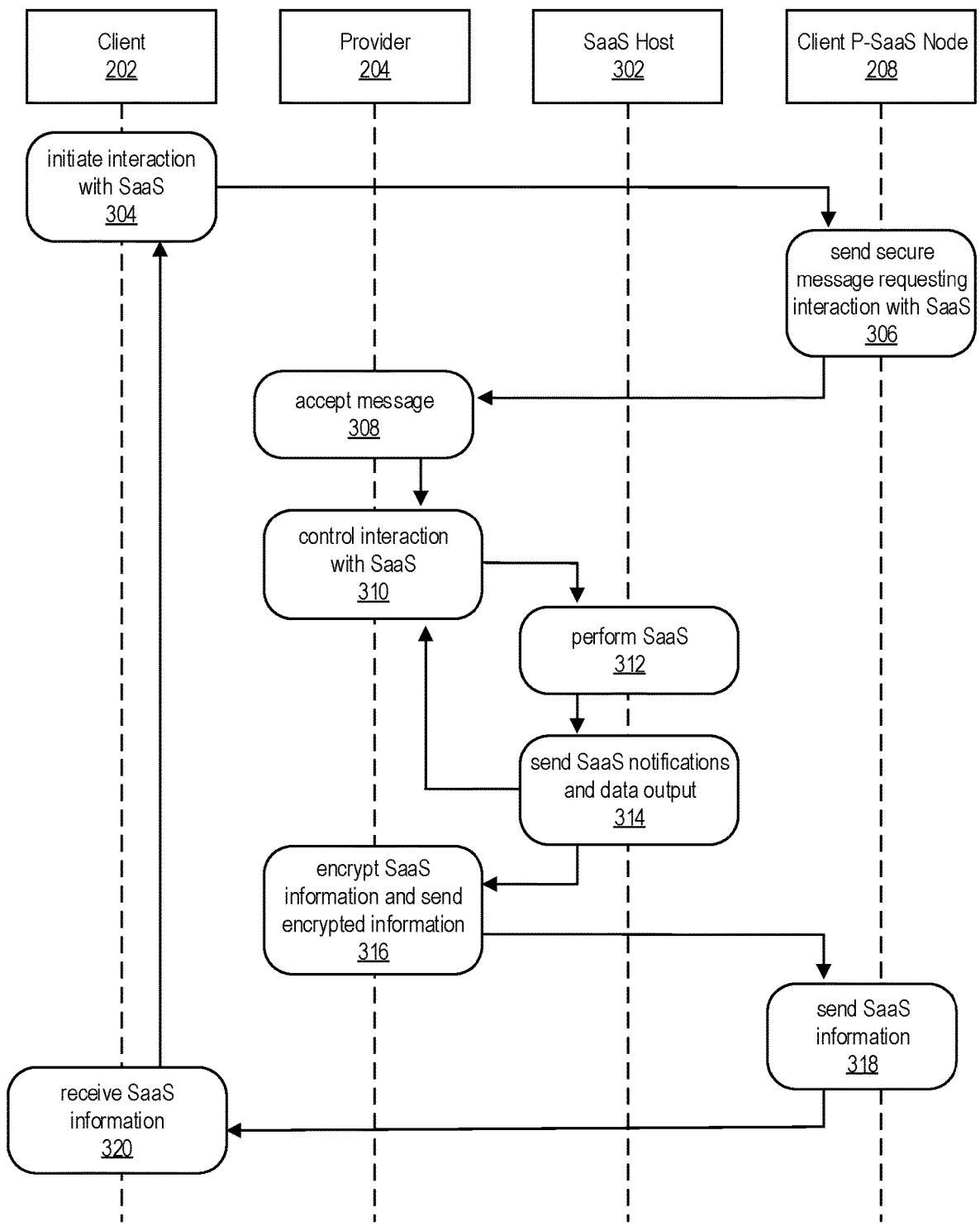
FIG. 3 illustrates an example workflow for network and application usage that leverages technologies for provisioning of private computer networks and application software as well as providing private SaaS, in accordance with some embodiments of the present disclosure.

As mentioned herein, FIG. 3 illustrates an example workflow 300 for network and application usage that leverages technologies for provisioning of private computer networks and application software as well as providing private SaaS, in accordance with some embodiments of the present disclosure. FIG. 3 shows a workflow of example customer application usage of private SaaS according to some embodiments of the present disclosure. The steps of workflow 300 are implemented by technical aspects of the client 202, the provider 204, a SaaS Host 302 (e.g., see server-side aspect 112a), and the client P-SaaS node 208.

The workflow 300, at step 304, commences with client 202 initiating interaction with the service or application provided by the provider 204—discussed with respect to workflow 200. The initiation at step 304 can occur via the client-side aspect of the service or application (e.g., see client-side aspects 103a, 103b, and 103c).

The workflow 200, at step 306, continues with the client P-SaaS node 208 sending a secure message requesting interaction with the service or application provided by the provider 204. The sending can be implemented by a second server-side aspect of the service or application or a copied or derived version of the server-side aspect (e.g., see copied or derived server-side aspects 107a, 107b, and 107c). The workflow 200, at step 308, continues with the provider 204 accepting the message. The workflow 200, at step 310, continues with the provider 204 controlling the interaction with the service or application. The acceptance of the message at step 308 as well as the operations at step 310 can occur via a server-side aspect of the service or application (e.g., see server-side aspects 112a, 112b, and 112c).

The workflow 200, at step 312, continues with the SaaS host 302 performing technical aspects of the service or application provided by the provider 204. The workflow 200, at step 314, continues with the SaaS host 302 sending notifications and data output related to the service or application provided by the provider 204. In some embodiments, the SaaS host can be implemented by the server-side aspect of the service or application or the second server-side aspect of the service or application or a copied or derived version of the server-side aspect.

The workflow 200, at step 316, continues with the provider 204 encrypting information of the service or application and sending the encrypted information to the client P-SaaS node 208 so that it can be accessed by the client 202. The operations at step 316 can occur via the server-side aspect of the service or application. Also, the workflow 200 can repeat step 310—which is the controlling of the interaction with the service or application. At step 318, upon receiving the encrypted information from the provider 204, the client P-SaaS node 208 sends the SaaS information to the client 202. Step 318 can be implemented by the second server-side aspect of the service or application or a copied or derived version of the server-side aspect. And, at step 320, the client 202 receives the SaaS information. Step 320 can be implemented by the client-side aspect of the service or application.

When the client 202 is using the provider's application (via its own client node, e.g., node 208), at various times the application can require access to shared resources owned and controlled by the provider 204. For example, the provider's application may need to send an email or store a file in a cloud storage service. One solution to this would be to allow the client node 202 to communicate directly with the shared resource or cloud service provider (e.g., SaaS Host 302). This would require providing the client node 202 with authentication credentials to that resource or service. There are problems with the aforesaid approach such as the credentials providing access to the cloud service provider may change (for example a password is changed). Because the provider 204 has no access to the client node (e.g., node 208), it cannot update the password. The changed password would have to be communicated to the client node via a secure message, and the client node would then update the credentials. Also, the cloud service provider may limit access to its services by network IP address. The provider 204 may have a maximum limit to the number of IP addresses allowed for any given user. Because the provider's number of customers may grow to a very large number, the aforesaid approach may hit the limit, resulting in the provider no longer being able to add new customers.

Alternatively, in some embodiments, the process of adding a new authorized IP address is often not accessible via API and can be done manually by a human going to the web site of the cloud service provider (e.g., SaaS Host 302) and entering the address. This process does not work well if the provider 204 requires automatically onboarding new customers without human intervention. If the client node (e.g., node 208) possesses the credentials to the cloud service, its access to the cloud service may be unfettered, allowing one client node to interfere with another client node. One client node (e.g., node 208) may be able to read or write another client node's data that is stored in the cloud service or impersonate another client when using the cloud service. For such reasons, the credentials for (and access to) any shared cloud service are mediated by the provider 204. The client node (e.g., node 208) does not have direct access to the cloud service, but instead requests an operation to perform on the cloud service via a secure message to the provider 204. The provider 204 can then validate that the operation is allowed.

The provider 204 can also optionally scope the operation to the specific client node (e.g., node 208). The provider 204 can also perform the operation on the cloud services and report the data or result back to the client node via a secure message. An example of a scoping the operation can include multiple client nodes (e.g., node 208) having shared access to a shared storage service. The provider 204 can ensure that each client (e.g., client 202) has their own private section within the bucket and disallow operations on sections of the bucket that are not scoped to the specific client node (e.g., node 208). With such an approach, the provider 204 can change the authentication credentials to the cloud service with no impact to client nodes (e.g., node 208). The provider 204 does not need to authorize client node IP addresses to communicate directly with the cloud service. The provider 204 can enforce isolation of client nodes against one another when accessing the cloud service. A security breach of a client node (e.g., node 208) does not result in the cloud service credentials being compromised, since the credentials are not stored in the node. Also, the client (e.g., client 202) does not need to maintain cloud credentials, it is a consistent way to access cloud services, and there is enhanced privacy protection for the client. Such a benefit occurs because the cloud service provider (e.g., SaaS Host 302) only sees requests coming from the provider, it is difficult or impossible for the cloud service provider to track per-Client activity.

Figure 4:
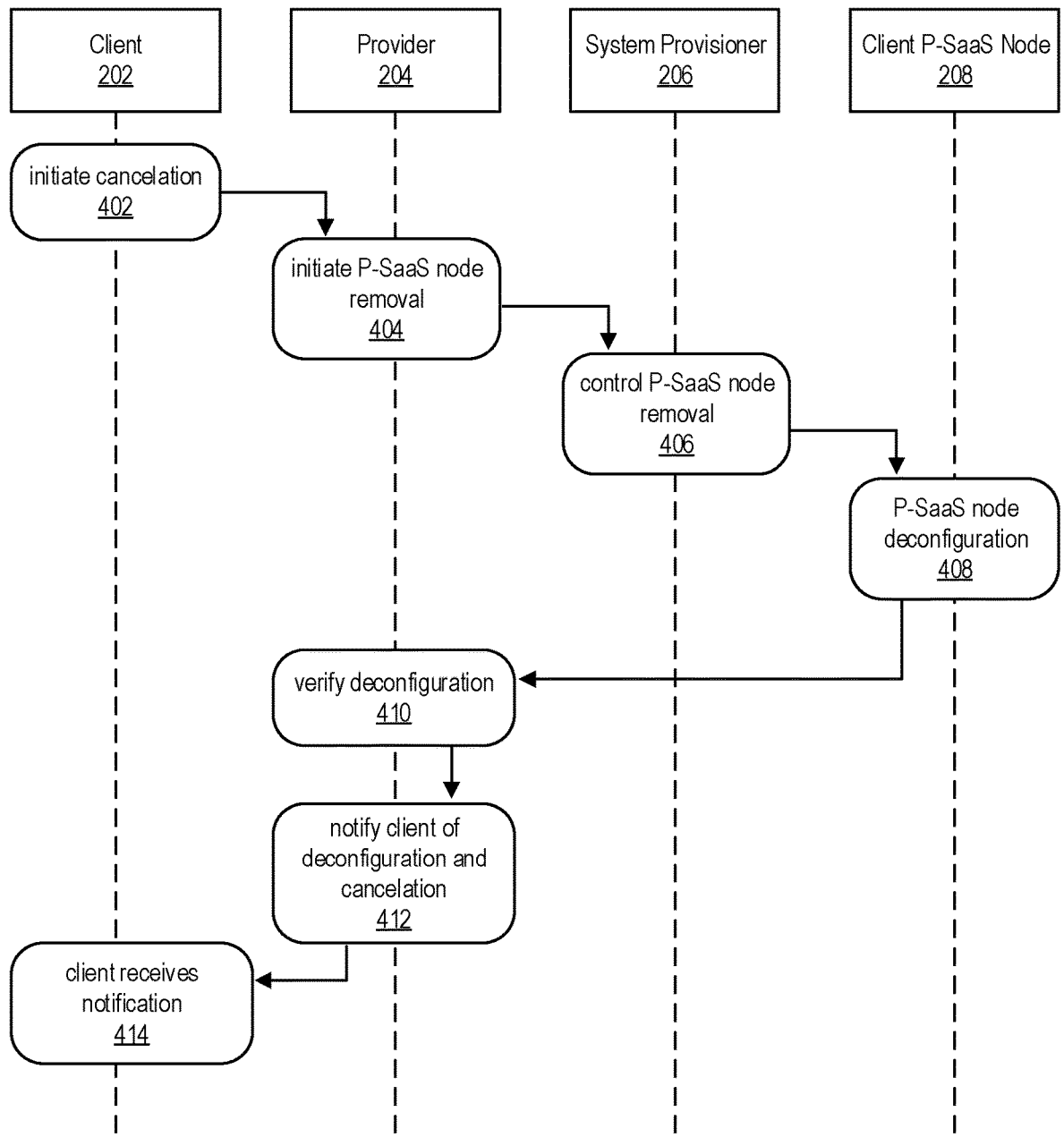
FIGS. 4 and 5 illustrate example workflows for ending service using the technologies for provisioning of private computer networks and application software as well as providing private SaaS, in accordance with some embodiments of the present disclosure.
Figure 5:
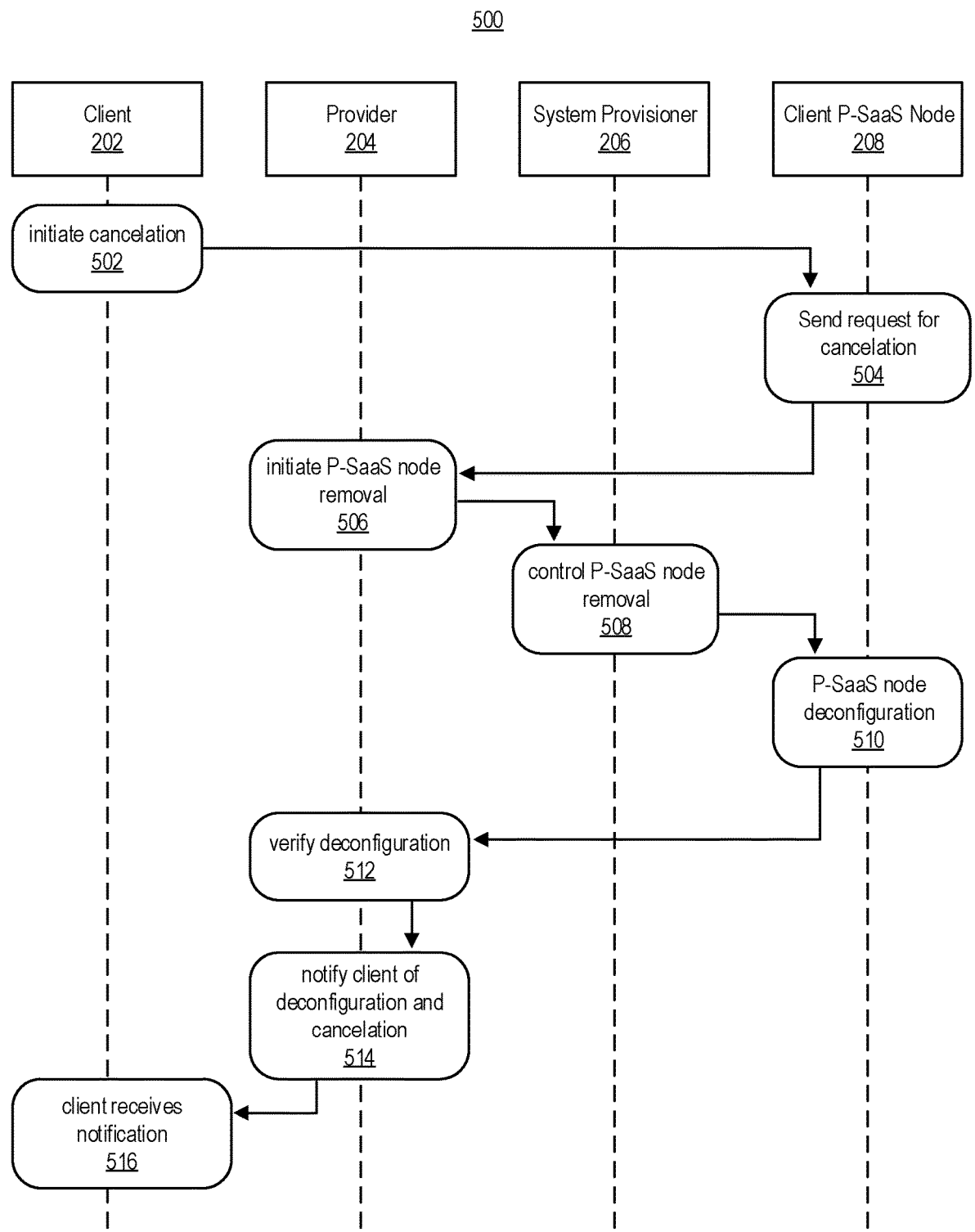

As mentioned herein, FIGS. 4 and 5 illustrate example workflows for ending service using the technologies for provisioning of private computer networks and application software as well as providing private SaaS, in accordance with some embodiments of the present disclosure. FIGS. 4 and 5 show workflows for ending service of a private SaaS according to some embodiments of the present disclosure. FIG. 5 shows a workflow 500 where service termination is initiated by the client node on behalf of a request made by the client. The steps of workflows 400 and 500 are implemented by technical aspects of client 202, provider 204, system provisioner 206, and client P-SaaS node 208.

The workflow 400, at step 402, commences with client 202 initiating cancelation of the service or application provided by the provider 204. The cancelation at step 402 can occur via the client-side aspect of the service or application (e.g., see client-side aspects 103a, 103b, and 103c). The workflow 400, at step 404, continues with the provider 204 initiating removal of the P-SaaS node 208. The initiation of the removal of the node 208 can occur via a server-side aspect of the service or application (e.g., see server-side aspects 112a, 112b, and 112c). At step 406, the workflow 400 continues with the system provisioner 206 controlling the removal of the node 208 (e.g., see provisioners 111a, 111b, and 111c). At step 408, the workflow 400 continues with the Client P-SaaS node 208 deconfiguring itself to remove access to the provider's SaaS. The self-deconfiguration can occur via a second server-side aspect of the service or application or a copied or derived version of the server-side aspect (e.g., see copied or derived server-side aspects 107a, 107b, and 107c). At step 410, the workflow 400 continues with the provider 204 verifying the deconfiguration. At step 412, the workflow 400 continues with the provider 204 notifying the client 202 of the deconfiguration and cancelation of the SaaS. The operations at steps 410 and 412 can occur via the server-side aspect of the service or application. Finally, at step 414, the workflow 400 continues with the client 202 receiving the notification of cancelation—which can be implement by the client-side aspect of the service or application.

When a customer would like to cancel their service or when the provider 204 wishes to forcibly terminate service for a customer (for example due to non-payment), there are many ways the service can be ended. In one example method, the service termination is initiated by the provider 204 (such as in response to a client request, or unilaterally by the provider), as shown in FIG. 4. If the cancelation occurs unilaterally, step 402 does not occur in the workflow 400. In another method, service termination can be initiated by the client P-SaaS 208, on behalf of a request made by the client 202—as shown in FIG. 5.

The workflow 500 in FIG. 5, at step 502, commences with client 202 initiating cancelation of the service or application provided by the provider 204. The cancelation at step 402 can occur via the client-side aspect of the service or application. The workflow 500, at step 504, continues with the client P-SaaS node 208 sending a request for cancelation of the SaaS and removal of itself. The request is sent to the provider 204. The sending of the request can occur via a second server-side aspect of the service or application or a copied or derived version of the server-side aspect of the service or application. The workflow 500, at step 506 (similar to step 404 in FIG. 4), continues with the provider 204 initiating removal of the P-SaaS node 208. At step 508 (similar to step 406), the workflow 500 continues with the system provisioner 206 controlling the removal of the node 208. At step 510 (similar to step 408), the workflow 500 continues with the Client P-SaaS node 208 deconfiguring itself to remove access to the provider's SaaS. At step 512 (similar to step 410), the workflow 500 continues with the provider 204 verifying the deconfiguration. At step 514 (similar to step 412), the workflow 500 continues with the provider 204 notifying the client 202 of the deconfiguration and cancelation of the SaaS. Finally, at step 516 (similar to step 414), the workflow 500 continues with the client 202 receiving the notification of cancelation.

The client node (e.g., node 208) can be a single machine. Or, the node (e.g., node 208) can be a network of machines that cooperate to deliver the provider's application. The network of machines can be physically located in the same datacenter. The network of machines can be widely geographically distributed. In such an example, the provider 204 performs the same steps, but the self-setup package contains instructions to request additional provisioned servers from the provider. Such requests can use the same secure messaging protocol used for all communications between the client node (e.g., node 208) and the provider 204. The difference would be that the provider 204 can use the client node's public key as the authentication mechanism, such that the provider never has access to the newly provisioned server (e.g., node 208). Or, the provider 204 can notify the client node (e.g., node 208) when the newly provisioned server is available, and the client node can proceed with further configuration steps to set up the provisioned server as an additional client node cooperating with the other client nodes. Tear down of a provisioned node (e.g., node 208) can also operate in an analogous fashion, the difference being that the provider 204 can instruct each provisioner (e.g., provisioner 206) that the provisioned server (e.g., node 208) for the client (e.g., client 202) is to be torn down and that all servers for a particular customer are to be removed or deconfigured.

In some embodiments, methods and systems for private SaaS include providing SaaS applications in a manner configured where a SaaS vendor (e.g., see provider 204) does not have any access to customer data, yet a customer (e.g., see client 202) can successfully use the SaaS application. In some embodiments, the method and/or system for private SaaS includes a SaaS application, a system provisioner (e.g., see provisioner 206), and/or client nodes (e.g., see node 208). The SaaS application is offered by a SaaS provider (e.g., see provider 204) and includes a collection of software and associated physical infrastructure upon which to operate it. The system provisioner is configured to provide new server machines for use by individual clients or customers of the SaaS provider. The client nodes (e.g., server machines such as can be include in the node 208) are configured to deliver the SaaS application to clients (e.g., see client 202). In some embodiments of the method and/or system for private SaaS, the client data is inaccessible to the SaaS provider (e.g., see provider 204), which can include by malicious actors that have infiltrated the SaaS provider.

Figure 6:
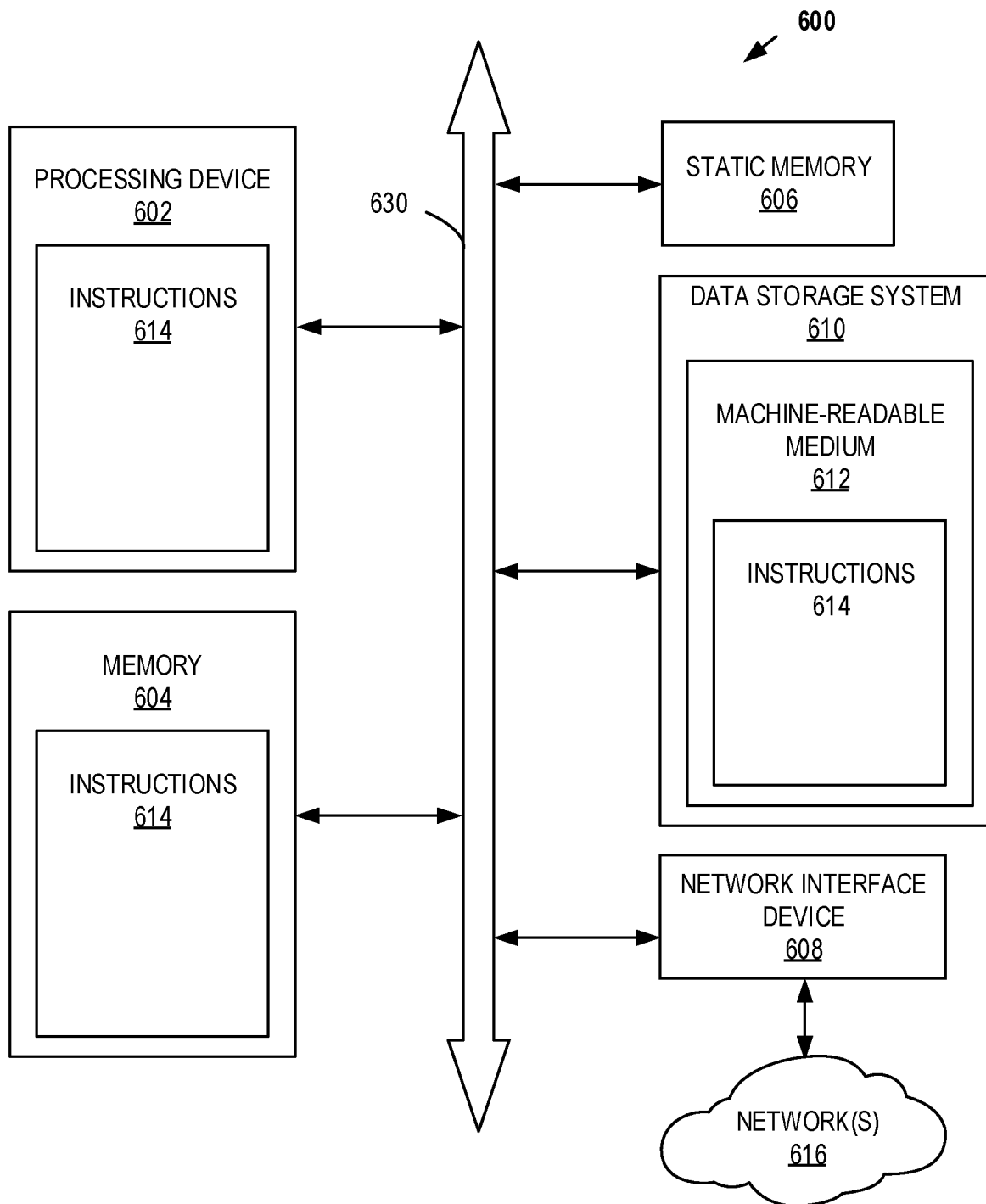
FIG. 6 is a block diagram of example technical aspects of an example computer system, in accordance with some embodiments of the present disclosure.

FIG. 6 is a block diagram of example technical aspects of an example computer system 600, in accordance with some embodiments of the present disclosure. FIG. 6 illustrates parts of the computer system 600 within which a set of instructions, for causing the machine to perform any one or more of the methodologies discussed herein, can be executed. In some embodiments, the computer system 600 can correspond to a host system that includes, is coupled to, or utilizes memory or can be used to perform the operations of a controller (e.g., to execute an operating system to perform operations corresponding to the client devices 102a to 102c, provisioned sever devices 106a to 106c, or the provider server devices 110a to 110c). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM), etc.), a static memory 606 (e.g., flash memory, static random-access memory (SRAM), etc.), and a data storage system 610, which communicate with each other via a bus 630.

The processing device 602 represents one or more general-purpose processing devices such as a microprocessor, a central processing unit, or the like. More particularly, the processing device can be a microprocessor or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 614 for performing the operations discussed herein. The computer system 600 can further include a network interface device 608 to communicate over one or more networks 616 which can include the LAN/WAN network(s) 104 and/or the LAN/WAN network(s) 108 of FIG. 1.

The data storage system 610 can include a machine-readable storage medium 612 (also known as a computer-readable medium) on which is stored one or more sets of instructions 614 or software embodying any one or more of the methodologies or functions described herein. The instructions 614 can also reside, completely or at least partially, within the main memory 604 and/or within the processing device 602 during execution thereof by the computer system 600, the main memory 604 and the processing device 602 also constituting machine-readable storage media.

In one embodiment, the instructions 614 include instructions to implement functionality corresponding to the client devices 102a to 102c, provisioned sever devices 106a to 106c, or the provider server devices 110a to 110c. While the machine-readable storage medium 612 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    provisioning, by a provider computing system of an application provider, an application server to interact with one or more client devices exclusively,
        the provisioning using a first authentication method that allows access to the application server by the provider computing system and secures communications between the provider computing system and the application server; and
        the first authentication method using a public key of the provider computing system;
    securely sending, by the provider computing system, self-configuration instructions to the provisioned server using the first authentication method;
    generating, by the provisioned server, a second authentication method using the self-configuration instructions, the second authentication method providing secure communications between the provisioned server and the one or more client devices as well as between the provisioned server and the provider computing system; and
        the second authentication method using a public key of the provisioned server;
    disabling, by the provisioned server, the first authentication method using the self-configuration instructions, so that the provider computing system no longer has access to the provisioned server; and
    serving to the one or more client devices, via the provisioned server, an application hosted by the provider computing system.

2. The method of claim 1 comprising copying at least part of the application to the provisioned server using the self-configuration instructions.

3. The method of claim 1, wherein each one of the first and second authentication methods comprises respective generation of a public key and a corresponding private key.

4. The method of claim 1, comprising removing, by the provider computing system, the provisioning of the provisioned server after a request to cancel the application is received from the provisioned server.

5. The method of claim 1, comprising removing, by the provider computing system, the provisioning of the provisioned server after a request to cancel the application is received from one of the one or more client devices.

6. The method of claim 1, comprising storing, by the provider computing system, the public key of the provisioned server.

7. The method of claim 1, comprising notifying, by the provider computing system, the one or more client devices that the provisioned server is configured to interact with the one or more client devices exclusively.

8. The method of claim 7, comprising the provisioned server interacting with the one or more client devices exclusively after the notification is received by the one or more client devices.

9. The method of claim 8, comprising:
    receiving, by the provisioned server, a request sent from the one or more client devices to initiate interaction with the application, wherein the interaction with the application is via the provisioned server; and
    verifying and accepting, by the provisioned server, the request according to the second authentication method.

10. The method of claim 9, comprising delegating, by the provisioned server, a task of the application to the provider computing system using the second authentication method.

11. The method of claim 10, comprising:
    receiving, by the provisioned server, output of the delegated task using the second authentication method;
    verifying, by the provisioned server, validity of the output of the delegated task according to the public key of the provisioned server; and
    sending, by the provisioned server, the output to the one or more client devices after verifying the validity of the output.

12. A non-transitory computer readable medium tangibly encoded with computer-executable instructions, that when executed by a processor associated with a computing device, performs a method comprising:

provisioning, by a provider computing system of an application provider, an application server to interact with one or more client devices exclusively, the provisioning using a first authentication method that allows access to the application server by the provider computing system and secures communications between the provider computing system and the application server; and the first authentication method using a public key of the provider computing system;

securely sending, by the provider computing system, self-configuration instructions to the provisioned server using the first authentication method;

generating, by the provisioned server, a second authentication method using the self-configuration instructions, the second authentication method providing secure communications between the provisioned server and the one or more client devices as well as between the provisioned server and the provider computing system; and the second authentication method using a public key of the provisioned server;

disabling, by the provisioned server, the first authentication method using the self-configuration instructions, so that the provider computing system no longer has access to the provisioned server; and serving to the one or more client devices, via the provisioned server, an application hosted by the provider computing system.

13. The non-transitory computer readable medium of claim 12 comprising copying at least part of the application to the provisioned server using the self-configuration instructions.

14. The non-transitory computer readable medium of claim 12, wherein each one of the first and second authentication methods comprises respective generation of a public key and a corresponding private key.

15. The non-transitory computer readable medium of claim 12, comprising removing, by the provider computing system, the provisioning of the provisioned server after a request to cancel the application is received from the provisioned server.

16. The non-transitory computer readable medium of claim 12, comprising removing, by the provider computing system, the provisioning of the provisioned server after a request to cancel the application is received from one of the one or more client devices.

17. The non-transitory computer readable medium of claim 12, comprising storing, by the provider computing system, the public key of the provisioned server.

18. The non-transitory computer readable medium of claim 12, comprising notifying, by the provider computing system, the one or more client devices that the provisioned server is configured to interact with the one or more client devices exclusively.

19. The non-transitory computer readable medium of claim 18, comprising the provisioned server interacting with the one or more client devices exclusively after the notification is received by the one or more client devices.

20. The non-transitory computer readable medium of claim 19, comprising:

receiving, by the provisioned server, a request sent from the one or more client devices to initiate interaction with the application, wherein the interaction with the application is via the provisioned server; and verifying and accepting, by the provisioned server, the request according to the second authentication method.

\* \* \* \* \*